(12) United States Patent
Shitsukawa et al.

(10) Patent No.: US 6,318,897 B1
(45) Date of Patent: Nov. 20, 2001

(54) ROLLER BEARING AND A METHOD OF PRODUCING THE SAME

(75) Inventors: Kenji Shitsukawa, Minami Kawachi-gun; Masamichi Shibata, Mie-ken; Masaaki Sakuragi, Yao, all of (JP)

(73) Assignee: Koyo Seiko Co., Ltd., Osaka-fu (JP)

( * ) Notice: Subject to any disclaimer, the term of this patent is extended or adjusted under 35 U.S.C. 154(b) by 0 days.

(21) Appl. No.: 09/518,883

(22) Filed: Mar. 6, 2000

(30) Foreign Application Priority Data

Mar. 10, 1999 (JP) .................................................. 11-063623

(51) Int. Cl.$^7$ ..................................................... F16C 19/00
(52) U.S. Cl. ........................... 384/450; 384/568; 384/569; 29/898.066; 29/898.068
(58) Field of Search ..................................... 384/450, 568, 384/565, 569; 29/898.066, 898.068

(56) References Cited

U.S. PATENT DOCUMENTS 4,877,340    10/1989    Hoeprich .

FOREIGN PATENT DOCUMENTS

WO 99/02874    1/1999    (WO) .

*Primary Examiner*—Lenard A. Footland
(74) *Attorney, Agent, or Firm*—Jordan and Hamburg LLP

(57) ABSTRACT

A bearing is provided which can be sufficiently processed by a usual NC grinding machine, and attain a life period that is substantially equal to that of a bearing having a theoretical crowning shape which is derived from the elastic contact theory, even when the bearing is used in a portion to which a heavy load or a high torque load is applied. As means for realizing such a bearing, a generating line of a rolling surface of a roller or a raceway surface of an inner or outer race is divided into a plurality of zones, and the shape of the generating line is approximated to a special curve shape which is theoretically derived, by a plurality of circular arcs which are contacted with each other on the border line between the corresponding zones. Therefore, it is possible to obtain a roller bearing which can be practically used, and which can attain a life period that is substantially equal to that of a bearing having an ideal crowning shape.

3 Claims, 3 Drawing Sheets

| Crowning | | Ratio of life |
|---|---|---|
| Theoretical shape |  | 1 |
| 2arcs + straight line (Complex) |  | 0.82 |
| 3arcs |  | 0.91 |
| 4arcs |  | 0.96 |
| 5arcs |  | 0.98 |
| 7arcs |  | 1.00 |
| 10arcs |  | 1.00 |

ROLLER BEARING AND A METHOD OF PRODUCING THE SAME

BACKGROUND OF THE INVENTION

The invention relates to a roller bearing in which cylindrical rollers or tapered rollers are used as rolling elements, and particularly to a roller bearing that is suitably used in a portion to which a heavy load or a high momentum load is applied.

In a cylindrical roller bearing or a tapered roller bearing, a crowning process is applied to the rolling surfaces of the rollers and the raceway surfaces of the inner and outer races, so that the edge load which acts under load conditions between end portions of the roller rolling surface and the raceway surfaces can be reduced.

The crowning process is applied to the generating line of the rolling surface of each roller or the raceway surface of the inner or outer race so that the outer diameter of each end portion is slightly smaller than that of the center portion. Conventionally, a trapezoid or a simple circular arc is practically used as the crowning shape (the shape of the profile line to the direction of the generating line).

When a load or a momentum acting on a bearing is excessively heavy, the contact surface pressure between a roller and the bearing ring is raised to increase the internal stress. Therefore, the above-mentioned crowning shape such as a trapezoid or a simple circular arc fails to effectively reduce the edge load, with the result that the life period of the bearing is shortened.

A method in which crowning to a shape of a logarithmic curve based on the elastic contact theory is employed may be applied on such a bearing to which a heavy load or a high momentum load is applied. As one of crowning shapes used in such a method, known is a crowning shape based on the following Lundberg's expression:

$$Zp(x)=\{(1-v_1^2)/E_1+(1-v_2^2)/E_2\}Q_d \times \log\{1-(2x/l_a)^2\}^{-1}/(\pi \cdot l_a) \quad (1)$$

In the expression, $Zp(x)$ indicates the size of a gap between the rolling surface of a roller and the raceway surface of the inner or outer race, in the bearing radial direction (z-direction) at a position in the direction of the common generating line (x-direction) in a state where the rolling surface and the raceway surface are contacted with each other in an unloaded condition. The origin of the x-axis is set at the center in the axial direction of the roller. In the expression, $E_1$: Young's modulus of the roller
$E_2$: Young's modulus of the inner or outer race
$v_1$: Poisson's ratio of the roller
$v_2$: Poisson's ratio of the inner or outer race
$Q_d$: load of a rolling element
$l_a$: effective length of the profile line of the roller.

The Lundberg's expression is a theoretical expression for uniformalizing a contact stress between a plate of an infinite width and a roller, and cannot be applied as it is to the case where a raceway surface of a finite length is contacted with a roller as in the case of a roller bearing. According to studies conducted by the inventors, the followings have been found. It is preferable to use an expression which is obtained by multiplying a positive constant k and above-mentioned Lundberg's expression $Zp(x)$, or form a gap which is indicated by $$Z(x)=kZp(x) \quad (2)$$

between a roller rolling surface and the raceway surface. It is further preferable to set the value of k to be in the range of from 1.5 to 10. These findings have been already proposed.

Both the expressions (1) and (2) based on the elastic contact theory are special logarithmic curves. In order to form a gap indicated by such a special curve between the roller rolling surface and the raceway surface of the inner or outer race, the shape of the profile line in the direction of the generating line (hereinafter, such a shape is referred to merely as "generating line shape") of at least one of the roller rolling surface and the raceway surface must be processed into a shape corresponding to such a logarithmic curve.

On the other hand, when a ground surface of a shape of a special curve is to be formed on the surface of an article, an NC (Numerically Controlled) grinding machine is usually used. Frequently, the surface of a grindstone is dressed into the negative shape of the desired curve shape by a dressing mechanism of the grinding machine, and the surface of the article is then ground.

However, a dressing mechanism of an NC grinding machine usually operates only along a linear or arcuate locus. In a practical use, therefore, it is very difficult to, in order to obtain a gap indicated by a logarithmic curve of the above-mentioned expression (1) or (2), grind the generating line shape of the rolling surface of the roller or the raceway surface of the inner or outer race, into the shape of the desired logarithmic curve.

SUMMARY OF THE INVENTION

The invention has been conducted in view of the above-mentioned circumstances. It is an object of the invention to provide a practical roller bearing having a crowning shape that allows a gap substantially corresponding to a theoretically calculated gap based on the elastic contact theory indicated by the above-mentioned expression (1) or (2) to be formed between the roller rolling surface and the raceway surface of at lest one of the inner and outer races, thereby realizing a long life period even when a heavy load or a high momentum load is applied.

In order to attain the object, the roller bearing of the invention is a roller bearing in which a plurality of rollers are arranged between inner and outer races, and characterized in that, in order that, in a state where the rolling surface and the raceway surface of the inner or outer race are contacted with each other in an unloaded condition, a gap in a bearing radial direction (z-direction) at a position in a direction of a common generating line (x-direction) satisfies a theoretical value $Z(x)$ which is calculated on the basis of an elastic contact theory, a shape of a generating line of at least one of the rolling surface and the raceway surface is approximated to a shape based on the theoretical value $Z(x)$ by a set of a plurality of circular arcs which are indicated by $$(x-a_i)^2+(z-b_i)^2=r_i^2 \text{(where } i=1, 2, \ldots) \quad (3)$$

for respective plural zones, the generating line being divided into the zones, the circular arcs being contacted with each other at respective boundaries of the zones.

In the invention, as the theoretical value $Z(x)$, the above-mentioned expression (2), i.e., $$Z(x)=k \times \{(1-v_1^2)/E_1+(1-v_2^2)/E_2\}Q_d \times \log\{1-(2x/l_a)^2\}^{-1}/(\pi \cdot l_a) \quad (2)'$$

where an origin (x=0) of an x-axis is a center in an axial direction of a roller, and k: positive constant
$E_1$: Young's modulus of the roller
$E_2$: Young's modulus of the inner or outer race
$v_1$: Poisson's ratio of the roller $v_2$: Poisson's ratio of the inner or outer race $Q_d$: load of a rolling element $l_a$: effective length of the profile line of the roller is preferably employed.

According to the invention, in order to make the size of a gap between the rolling surface of a roller and the raceway surface of the inner or outer race at a position in the direction of the common generating line, correspond to a gap indicated by a theoretically obtained special curve such as a logarithmic curve, the generating line shape of one of the roller rolling surface and the raceway surfaces of the inner and outer races is not formed by a special curve shape corresponding to the special curve, but the special curve shape is approximated by a set of a plurality of circular arcs. Therefore, a practical processing by a usual NC grinding machine is enabled, thereby attaining the intended object.

As shown in FIG. 3, the generating line shape of the rolling surface of each roller or the raceway surface of the inner or outer race is divided into a plurality of zones in the direction of the generating line, and a special curve shape $A(x)$ based on a theoretical calculation is approximated for each of the zones by using the circle equation indicated by expression (3). In the approximation, a method may be used in which the circle equation in each zone is determined while using conditions that the circular arc of each zone passes coordinate $P_i$ $(x_i, y_i)$ of the special curve shape $A(x)$ on a border line of the zone to which the circular arc belongs, and that adjacent circular arcs are contacted with each other on the border line between the corresponding zones. According to this configuration, the special curve shape A can be smoothly approximated by the plurality of circular arcs.

In the invention, the generating line may be divided into any number of zones. However, it has been confirmed that a division number of 10 or less allows the maximum contact surface pressure to have a value which is substantially equal to that of a theoretical shape.

In the invention, the processing of the generating line shape may be performed only on the rolling surface of each roller, only the raceway surface of the inner or outer race, or both of the rolling surface of each roller and the raceway surface of the inner or outer race. In summary, it is required only that the gap between the rolling surface of a roller and the raceway surface of the inner race, or that between the rolling surface of a roller and the raceway surface of the outer race is a theoretically calculated gap such as the gap $Z(x)$ indicated by the above-mentioned expression (2). In the case where $Z(x)$ indicated by the expression (2) or (2)' is employed as the theoretical gap, any one of the following modes may be employed. When one of a roller rolling surface and a raceway surface which are contacted to each other is set to have a linear generating line shape, for example, the generating line shape of the other one may be set to have a curve shape of $Z(x)$ itself. When one of the generating line shapes is a simple circular arc, the other generating line shape may be a curve which is obtained by subtracting the arc curve from the curve of $Z(x)$. Alternatively, both of the generating line shapes may be a curve of $Z(x)/2$. The invention includes all of these modes.

The invention includes also a configuration in which one or both of the gap between the roller rolling surface and the raceway surface of the inner race, and the gap between the roller rolling surface and the raceway surface of the outer race are formed as a gap based on the crowning shape. In view of the process cost also, however, the effect of improving the life period of the bearing can be attained in a practical use even when only the gap between the inner race and each roller in which the contact surface pressure is higher, and which easily causes a bottleneck in the life period of the bearing is formed as such a gap.

In the invention of claim 2, the theoretical value of the gap which is to be formed between the roller rolling surface and the raceway surface of the inner or outer race and at a position in the direction of the common generating line is specified to the value $Z(x)$ indicated by the expression (2) or (2)'. It has been confirmed that the theoretical value $Z(x)$ is more effective to an actual bearing than the value $Zp(x)$ based on Lundberg's expression. When the generating line shape of at least one of a roller and the bearing ring is approximated by a plurality of circular arcs so as to obtain the gap of $Zp(x)$, the contact stress between the roller and the raceway can be very highly uniformalized, whereby the life period of the bearing can be prolonged.

DETAILED DESCRIPTION OF THE PREFERRED EMBODIMENTS

Hereinafter, an embodiment of the invention will be described with reference to the accompanying drawings.

Figure 1:
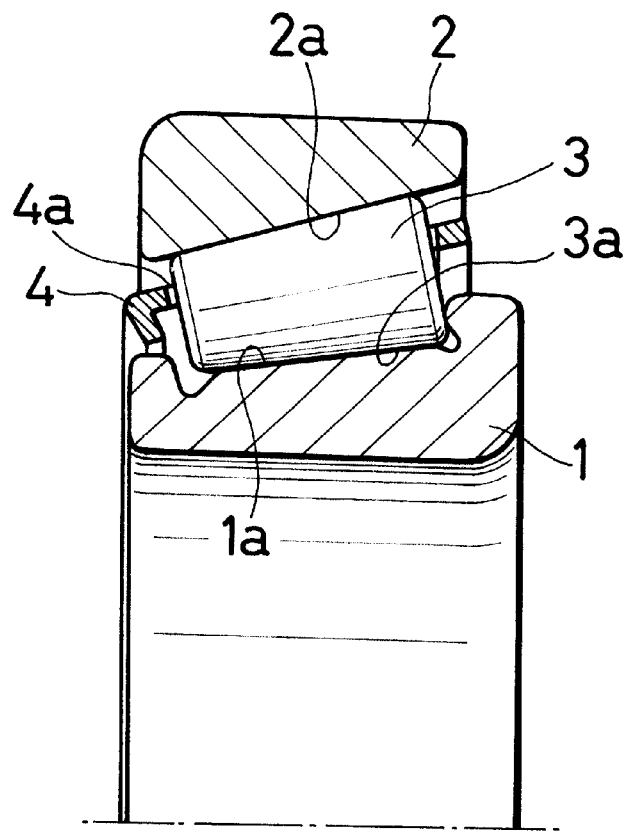
FIG. 1 is an axial section view showing a configuration in the case where the invention is applied to a tapered roller bearing.

FIG. 1 is an axial section view of an embodiment in which the invention is applied to a tapered roller bearing.

A plurality of tapered rollers 3 which are rollable and in each of which a rolling surface 3a configured by a conical surface is formed on the outer periphery, and a cage 4 in which pockets 4a that respectively house the tapered rollers 3 so as to define the mutual peripheral positions of the tapered rollers 3 are formed at a regular pitch are disposed between an inner race 1 in which a raceway surface 1a configured by a conical surface is formed on the outer periphery, and an outer race 2 in which a raceway surface 2a configured by a conical inner surface is formed on the inner periphery.

Figure 2:
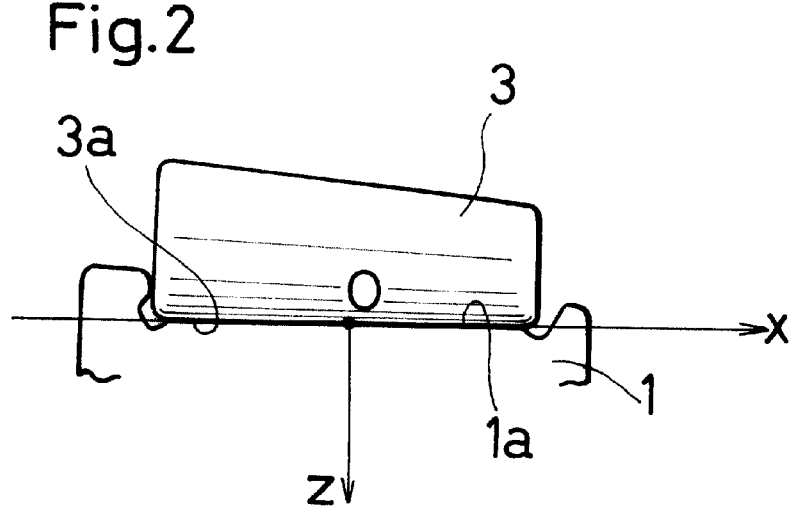
FIG. 2 is a diagram illustrating a coordinate used in the description of an embodiment of the invention.

In the embodiment, a crowning process which is a characteristic configuration of the invention is applied to the raceway surface 1a of the inner race 1, and the rolling surfaces 3a of the tapered rollers 3. In the following description, it is assumed that a coordinate which is defined in FIG. 2 is used. Namely, the direction of the common generating line in a contact portion between the raceway surface 1a of the inner race 1 and the rolling surface 3a of each of the tapered rollers 3 is set as the x-direction, the radial direction of the bearing, i.e., the depth direction of the crowning is set as the z-direction, and the origins of the x- and z-axes are set at the center in the axial direction on the generating line of the rolling surface 3a of the tapered roller 3.

In this example, the generating line shape of the rolling surfaces 3a of the tapered rollers 3 is set to a simple arcuate crowning shape which can be easily obtained by, for example, through-feed grinding using a centerless grinding machine. By contrast, the generating line shape of the raceway surface 1a of the inner race 1 is set to a shape in which a special logarithmic curve A(x) is approximated by a plurality of circular arcs as described in detail later.

Assuming that the curve of the simple arcuate generating line shape of the rolling surface 3a of each of the tapered rollers 3 is B(x), the special logarithmic curve A(x) is indicated by using Z(x) which is a logarithmic curve indicated by the above-mentioned expression (2) or (2)', or by $$A(x)=Z(x)-B(x) \tag{4}$$

When the special logarithmic curve A(x) itself is set as the generating line shape of the raceway surface 1a of the inner race 1, therefore, the gap formed between the raceway surface 1a of the inner race 1 and the rolling surface 3a of the tapered roller 3, and at a position in the direction of the generating line satisfies the theoretical gap Z(x) indicated by the above-mentioned expression (2) or (2)' based on the elastic contact theory, in cooperation with the generating line shape B(x) of the rolling surface 3a of the tapered roller 3.

Figure 3:
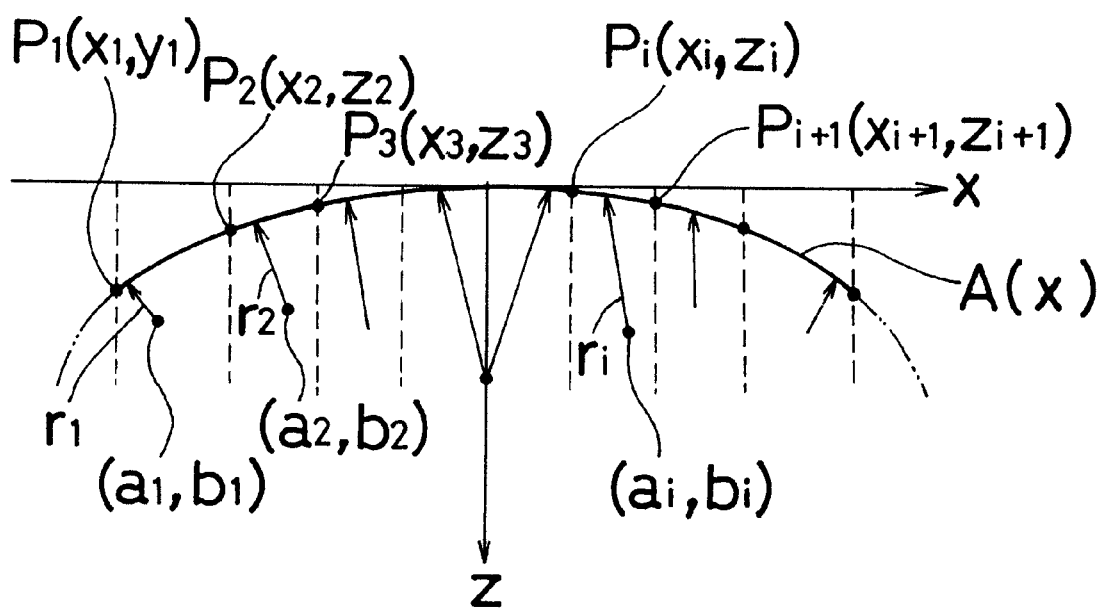
FIG. 3 is a graph illustrating the generating line shape of a raceway surface 1a of an inner race 1 of the embodiment of the invention.

The generating line shape of the raceway surface 1a of the inner race 1 is set to be bilaterally symmetrical with respect to the origin which is at the center of the direction of the generating line (direction of the x-axis). The specific shape of the generating line is set in the following manner. As shown in FIG. 3, the raceway surface 1a is divided along the direction of the generating line into an n number of zones, and, for each of the n zones, the generating line is set to have a shape elongating along the circle equation indicated by the above-mentioned expression (3), i.e., $$(x-a_i)^2+(z-b_i)^2=r_i^2 \text{(where } i=1, 2, \ldots, n\text{)}.$$

The generating line shape of the raceway surface 1a of the inner race 1 is approximated by the n number of circular arcs so as to substantially coincide with the special logarithmic curve A(x).

The coefficients $a_i$, $b_i$, and $r_i$ of the equation of the circular arcs can be determined in accordance with the following two conditions.

(a) Adjacent circular arcs are contacted with each other on the border line between the corresponding zones.

(b) Each circular arc passes coordinate $P_i$ ($x_i$, $y_i$) of the special logarithmic curve A(x) on the border line of the corresponding zone.

Under the above conditions, the special logarithmic curve A(x) can be smoothly approximated by a plurality of circular arcs. Such a generating line shape of the raceway surface 1a of the inner race 1 can be easily processed by a usual NC grinding machine having a dressing mechanism which operates along an arcuate locus. By a combination of the inner race 1 having such a generating line shape of the raceway surface 1a, and the tapered rollers 3 having the above-mentioned generating line shape of the rolling surfaces 3a, a tapered roller bearing can be obtained in which a gap between the raceway surface 1a of the inner race 1 and the rolling surface 3a of each of the tapered rollers 3 at a position in the direction of the generating line substantially satisfies the ideal gap Z(x) based on the elastic contact theory, and which can have a long life period even when the bearing is used under a heavy load or a high torque load.

According to the invention, a crowning shape which is approximated to the ideal special logarithmic curve A(x) can be sufficiently obtained by performing only a grinding process by using an NC grinding machine. When a polishing process is performed after the grinding process, points where the circular arcs are contacted with each other can be further smoothed, so that a crowning shape which is substantial identical with the theoretical shape A(x) is obtained.

Figure 4:
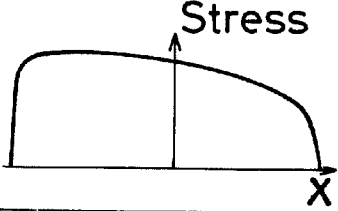
FIG. 4 is a view showing results of calculations of the distribution of the contact surface pressure between the inner race 1 and a tapered roller 3 in the case where the division number of the generating line of the raceway surface 1a of the inner race 1 is varied in the embodiment of the invention.
Figure 4:
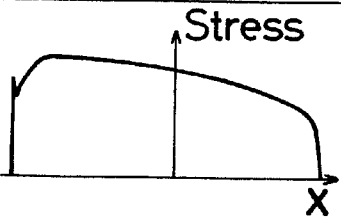
Figure 4:
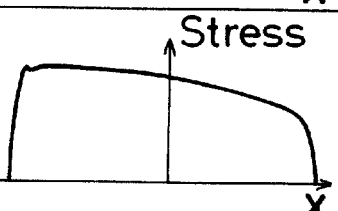
Figure 4:
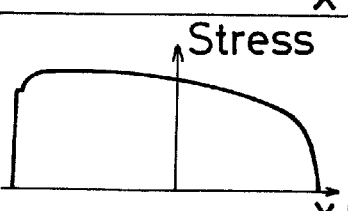
Figure 4:
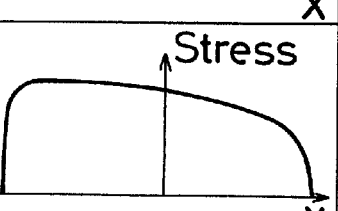
Figure 4:
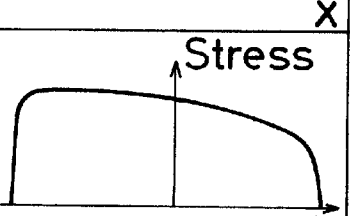
Figure 4:
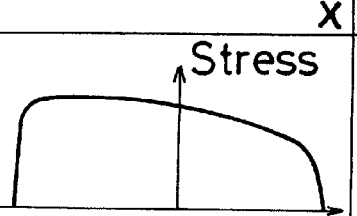

The contact surface pressure between the inner race 1 and the tapered roller 3 was calculated while variously changing the division number n of the generating line of the raceway surface 1a of the inner race 1 in the embodiment of the invention. FIG. 4 shows a result of the calculation. Naturally, the obtained shape is more similar to the theoretical shape A(x) as the division number n, i.e., the number of circular arcs used in the approximation is larger. When the number of circular arcs is larger, however, the work of inputting data for processing requires much labor. The object of the calculation is to obtain the division number n which is required for attaining a contact surface pressure that is substantially equal to the theoretical shape A(x) in a practical use.

In the calculation of the contact surface pressure, numerical computations were performed while the contact area between the inner race 1 and the tapered roller 3 is divided into (about 400) rectangles by using the contact problem analyzing technique which was reported by N. Ahdmadi, et al. The conditions and specific contents of the calculation are as follows. In a state where the inner race 1 and the outer race 2 are inclined with each other by 0°6', the distribution of the contact pressure that is applied to the inner race 1 by the tapered rollers 3 to which the maximum load is applied was calculated. In the graphs shown in FIG. 4, the abscissa indicates the position (x-axis) in the direction of the generating line, and the ordinate indicates the contact pressure. FIG. 4 shows also a life period ratio which was calculated on the basis of the maximum value of the contact surface pressure distribution obtained from the above-mentioned calculation, i.e., the maximum contact surface pressure. Assuming that the life period of a bearing substantially depends on the maximum contact pressure, the life period ratio was calculated as a life period ratio $L/L_0$ by the following expression:

$$L/L_0=(P_{max}/P_{max0})^{-20/3} \tag{5}$$

where $P_{max0}$: calculated value of the maximum contact pressure in the case where the gap between the inner race 1 and the tapered roller 3 at a position in the direction of the generating line is the ideal gap Z(x), $L_0$: life period in the case where the gap is the ideal gap Z(x), $P_{max}$: calculated value of the maximum contact pressure in the case where the crowning shape of the raceway surface 1a of the inner race 1 is approximated by a plurality of circular arcs, and L: life period in the case of the approximation.

As seen from the calculation results of FIG. 4, it has been confirmed that, at the generating line division number n=7, this example attains a contact surface pressure which is substantially equal to that in the case of the theoretical shape. From the calculation results of FIG. 4, it has been confirmed also that, even when the theoretical shape is approximated by a set of circular arcs of different radii, a locally excessive surface pressure is prevented from being generated, by connecting adjacent circular arcs to each other by a tangential line.

In the above, the example in which the invention is applied to a tapered roller bearing has been described. It is a matter of course that the invention can be applied also to a cylindrical roller bearing in the same manner.

As described above, according to the invention, the generating line shape of the rolling surface of each roller or the raceway surface of the inner or outer race is approximated by a set of circular arcs to a special curve shape such as a logarithmic curve which is derived from the elastic contact theory. Therefore, it is possible to obtain a bearing which can be processed by a usual NC grinding machine, sufficiently used in a practical use, and attain a life period that is substantially equal to that of a bearing of an ideal crowning shape, even when the bearing is used in a portion to which a heavy load or a high torque load is applied.

When the production method of the invention is employed, the approximation to the special curve shape by a set of circular arcs is performed by an NC grinding machine, and a polishing process is then performed, whereby the generating line shape can be easily made substantially coincide with the special curve shape.

FIG. 4

Crowning
   Theoretical shape
   Two arcs+straight line (composite)
   Three arcs
   Four arcs
   Five arcs
   Seven arcs
   Ten arcs
Stress
Life period ratio

What is claimed is:

1. A roller bearing in which a plurality of rollers are arranged between an inner race and an outer race, wherein in order that, in a state where a roller rolling surface and a raceway surface of said inner or outer race are contacted with each other in an unloaded condition, a gap in a bearing radial direction (z-direction) at a position in a direction of a common generating line (x-direction) satisfies a theoretical value $Z(x)$ which is calculated on the basis of an elastic contact theory, a shape of a profile line in the direction of a common generating line of at least one of said rolling surface and said raceway surface is approximated to a shape based on the theoretical value $Z(x)$ by a set of a plurality of circular arcs which are indicated by $$(x-a_i)^2+(z-b_i)^2=r_i^2 \text{(where } i=1, 2, \ldots \text{)}$$

for respective plural zones, the generating line being divided into the zones, the circular arcs being contacted with each other at respective boundaries of the zones.

2. A roller bearing according to claim 1, wherein the theoretical value $Z(x)$ is $$Z(x)=k\times\{(1-v_1^2)/E_1+(1-v_2^2)/E_2\}Q_d\times\log\{1-(2x/l_a)^2\}^{-1}/(\pi\cdot l_a)$$

where an origin (x=0) of an x-axis is a center in an axial direction of each of said rollers, and k: positive constant
$E_1$: Young's modulus of said roller
$E_2$: Young's modulus of said inner or outer race
$v_1$: Poisson's ratio of said roller
$v_2$: Poisson's ratio of said inner or outer race
$Q_d$: load of a rolling element
$l_a$: effective length of a profile line of said roller.

3. A method of producing a roller bearing in which a plurality of rollers are arranged between an inner race and an outer race, wherein in order that, in a state where a roller rolling surface and a raceway surface of said inner or outer race are contacted with each other in an unloaded condition, a gap in a bearing radial direction (z-direction) at a position in a direction of a common generating line (x-direction) satisfies a theoretical value $Z(x)$ which is calculated on the basis of an elastic contact theory, a shape of a profile line in the direction of a common generating line of at least one of said rolling surface and said raceway surface is formed by a grinding process into a shape configured by a set of a plurality of circular arcs which are indicated by $$(x-a_i)^2+(z-b_i)^2=r_i^2 \text{(where } i=1, 2, \ldots \text{)}$$

for respective plural zones, the generating line being divided into the zones, the circular arcs being contacted with each other at respective boundaries of zones, and a polishing process is then performed, thereby forming the profile line shape into a shape based on the theoretical value $Z(x)$.

* * * * *